US009391763B2

(12) United States Patent
Huang

(10) Patent No.: US 9,391,763 B2
(45) Date of Patent: Jul. 12, 2016

(54) CONFIGURING TIME-DIVISION DUPLEX MODE

(71) Applicant: Empire Technology Development LLC, Wilmington, DE (US)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/403,710

(22) PCT Filed: Feb. 28, 2013

(86) PCT No.: PCT/CN2013/072011
§ 371 (c)(1),
(2) Date: Nov. 25, 2014

(87) PCT Pub. No.: WO2014/131182
PCT Pub. Date: Sep. 4, 2014

(65) Prior Publication Data
US 2015/0156002 A1 Jun. 4, 2015

(51) Int. Cl.
*H04W 16/04* (2009.01)
*H04W 72/04* (2009.01)
*H04L 5/14* (2006.01)
*H04L 5/00* (2006.01)
*H04W 24/08* (2009.01)

(52) U.S. Cl.
CPC ............... *H04L 5/14* (2013.01); *H04L 5/0032* (2013.01); *H04W 24/08* (2013.01); *H04W 72/0446* (2013.01)

(58) Field of Classification Search
CPC ..... H04W 24/08; H04W 28/00; H04W 28/26; H04W 28/20; H04W 72/04; H04W 72/0413; H04W 72/0446; H04W 72/0486; H04W 72/12; H04L 5/0032; H04L 5/14
See application file for complete search history.

(56) References Cited

U.S. PATENT DOCUMENTS

| | | | |
|---|---|---|---|
| 7,116,983 B2 | 10/2006 | Lan et al. | |
| 7,167,483 B1 | 1/2007 | Sharma et al. | |
| 8,644,212 B2 * | 2/2014 | Zhang | H04W 52/52 370/318 |
| 8,804,561 B2 * | 8/2014 | Kazmi | 370/242 |
| 8,837,335 B2 * | 9/2014 | Susitaival | H04W 72/082 370/294 |
| 9,084,275 B2 * | 7/2015 | Wang | H04W 72/1231 |
| 2008/0207270 A1 | 8/2008 | Na et al. | |
| 2010/0246456 A1 * | 9/2010 | Suo | H04W 56/003 370/280 |
| 2013/0039193 A1 * | 2/2013 | Yin | H04W 72/0486 370/252 |

(Continued)

FOREIGN PATENT DOCUMENTS

| | | |
|---|---|---|
| CN | 1370356 A | 9/2002 |
| EP | 2234292 A1 | 9/2010 |
| WO | 2013025290 A1 | 2/2013 |

OTHER PUBLICATIONS

Chen, L. Y., et al., "Dynamic timeslot allocation algorithms suitable for asymmetric traffic in multimedia TDMA/TDD cellular radio," 48th IEEE Vehicular Technology Conference, 1998, VTC 98, vol. 2, pp. 1424-1428 (May 18-21, 1998).

(Continued)

*Primary Examiner* — Ahmed Elallam
(74) *Attorney, Agent, or Firm* — Brundidge & Stanger, P.C.

(57) ABSTRACT

In an LTE system, to configure TDD mode for different cells adjacent to a given cell, an EPC may apply different timeslot proportion configurations to the cells based on the uplink and downlink traffic of each cell.

20 Claims, 5 Drawing Sheets

(56) References Cited

U.S. PATENT DOCUMENTS

| | | | |
|---|---|---|---|
| 2013/0242812 A1* | 9/2013 | Khoryaev | H04L 5/1469 370/278 |
| 2013/0272169 A1* | 10/2013 | Wang | H04W 72/0446 370/280 |
| 2014/0010213 A1* | 1/2014 | Wang | H04B 7/0486 370/336 |
| 2014/0146696 A1* | 5/2014 | Lin | H04W 72/12 370/252 |
| 2014/0307591 A1* | 10/2014 | Wang | H04W 72/1231 370/278 |
| 2014/0307598 A1* | 10/2014 | Mizusawa | H04J 3/00 370/280 |
| 2015/0131495 A1* | 5/2015 | Zhang | H04W 72/0446 370/280 |
| 2015/0270933 A1* | 9/2015 | Feng | H04B 7/2656 370/280 |
| 2015/0365844 A1* | 12/2015 | Qin | H04W 16/02 370/280 |

OTHER PUBLICATIONS

International search report and written opinion for PCT application No. PCT/CN2013/072011 mailed on Dec. 5, 2013.

Venkataraman, H., and Muntean, G., "Dynamic Time Slot Partitioning for Multimedia Transmission in Two-Hop Cellular Networks," IEEE Transactions on Mobile Computing, vol. 10, No. 4, pp. 532-543 (Apr. 2011).

* cited by examiner

CONFIGURING TIME-DIVISION DUPLEX MODE

CROSS-REFERENCE INFORMATION

This application is a National Stage filing under 35 U.S.C. §371 of PCT Ser. No. PCT/CN2013/072011, filed on Feb. 28, 2013.

TECHNICAL FIELD

The embodiments described herein pertain generally to configuring Time-division Duplex (TDD) mode in a Long Term Evolution (LTE) system.

BACKGROUND

In an LTE system adopting TDD mode, an Evolved Packet Core (EPC) may select proper timeslot proportion configurations for uplink and downlink traffic in a cell and other cells adjacent to the cell.

SUMMARY

In one example embodiment, a method may include monitoring respective patterns of uplink traffic and downlink traffic in a first cell and at least a second cell that is adjacent to the first cell, and applying one of a plurality of timeslot proportion configurations for uplink traffic and downlink traffic in a cell cluster that includes the first cell and the second cell in response to a difference between the pattern of uplink traffic and downlink traffic in the first cell and the pattern of uplink traffic and downlink traffic in the second cell being less than a threshold difference.

In another example embodiment, an apparatus may include a memory in which a set of processor-executable instructions is stored; and a processor coupled to the memory, upon executing the set of processor-executable instructions, performing operations including obtaining information related to uplink traffic and downlink traffic in a first cell and in a second cell that is adjacent to the first cell, adopting one of a plurality of timeslot proportion configurations for uplink traffic and downlink traffic in the first cell and in the second cell in response to the obtained information indicative of a first condition, and adopting each of two of the plurality of timeslot proportion configurations for uplink traffic and downlink traffic in a respective one of the first cell and the second cell in response to the obtained information indicative of a second condition different from the first condition.

In yet another example embodiment, a computer-readable medium may store instructions that, when executed, may cause one or more processors to perform operations that include: establishing a first knowledge base of various ratios of uplink traffic and downlink traffic and corresponding timeslot proportion configurations of a plurality of timeslot proportion configurations to be applied to a given cell cluster that comprises a plurality of adjacent cells; establishing a second knowledge base of various ratios of uplink traffic and downlink traffic, corresponding timeslot proportion configurations of the plurality of timeslot proportion configurations to be applied to a respective cell or a cell cluster that comprises a plurality of adjacent cells, and corresponding conditions under which a given timeslot proportion configuration is applied to a corresponding ratio uplink and downlink traffics; monitoring respective patterns of uplink traffic and downlink traffic in a first cell and at least a second cell that is adjacent to the first cell; and applying a timeslot proportion configuration of the plurality of timeslot proportion configurations to a first cell or a cell cluster that comprises the first cell and at least the second cell for uplink traffic and downlink traffic in the first cell or the cell cluster in response to a pattern of uplink traffic and downlink traffic in the first cell or the cell cluster approximately matching the applied timeslot proportion configuration. The applied timeslot proportion configuration may be selected from the first knowledge base or the second knowledge base.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
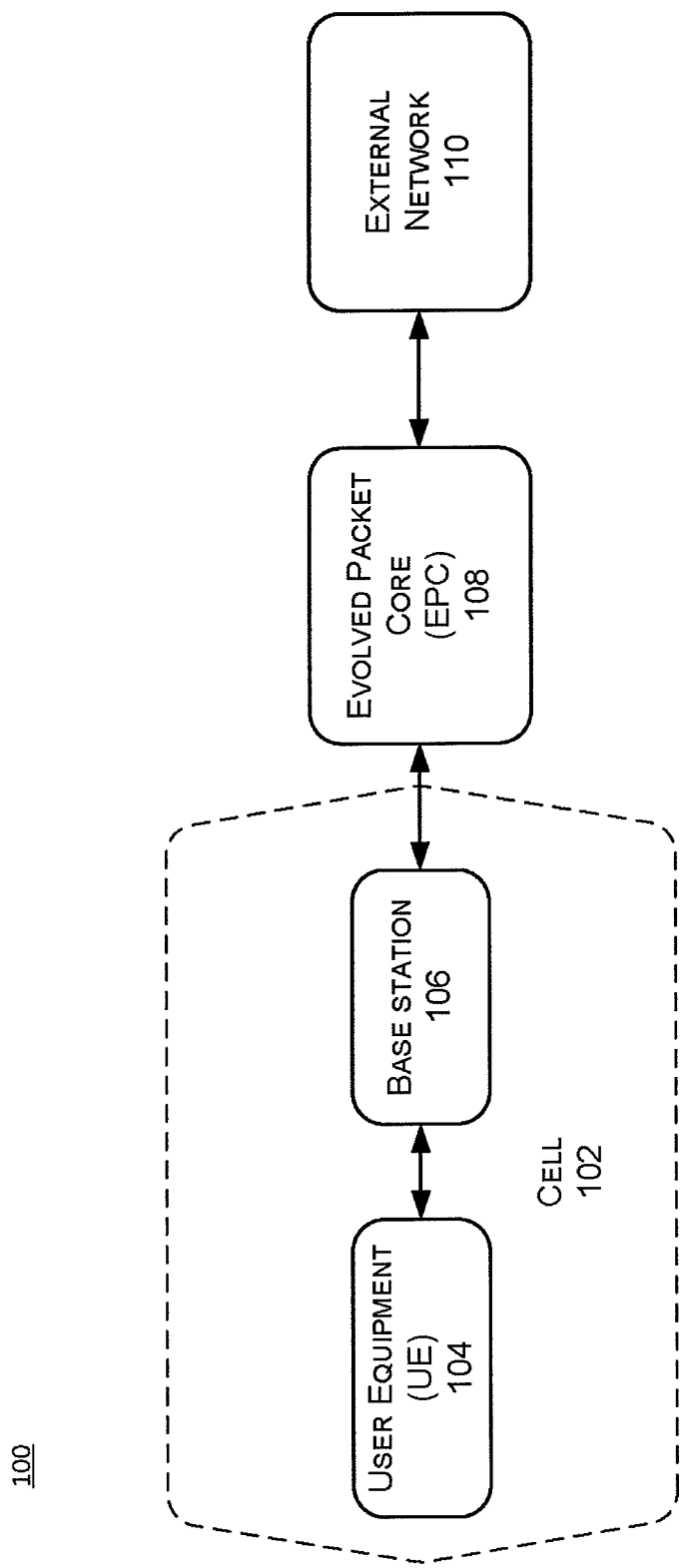
FIG. 1 shows an example wireless communication system in which one or more embodiments of configuring TDD mode may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example wireless communication system 100 in which one or more embodiments of configuring TDD mode may be implemented, arranged in accordance with at least some embodiments described herein. As depicted, wireless communication system 100 at least includes a cell 102 providing support for a wireless communication between a User Equipment (UE) 104 and a base station 106, an Evolved Packet Core (EPC) 108, and an external network 110.

Cell 102 may refer to a range of radio coverage in a respective cellular network. Cell 102 may be configured to provide wireless communication for user equipment therein, and may further be equipped with base station 106.

UE 104 may refer to a mobile (or portable) electronic device such as a mobile phone, smartphone, personal digital assistant (PDA) a personal media player device, an application specific device, or a hybrid device that includes any of the above functions. Alternatively, UE 104 may be implemented as a personal computer including tablet, laptop computer, non-laptop computer configure configurations, etc.

Base station 106 may be installed at a fixed location or may be implemented as a mobile base within the boundaries of cell 102. Further, base station 106 may transmit wireless signals to and from UE 104 when base station 106 is located within the boundaries of cell 102. Base station 106 may be configured to support wireless communication between one or more embodiments of user equipment 104 located within a corresponding cell. Such communication may be in accordance with different wireless communication standards including Time Division Duplex Long Term Evolution (TDD-LTE), Frequency Division Duplexing (FDD-LTE), IEEE 802.15.4, Global System for Mobile Communications (GSM), General packet radio service (GPRS), Code Division Multiple Access (CDMA), 3rd generation of mobile telecommunications technology (3G), and etc., which may further determine the work mode of the respective user equipment. The work modes may include TDD mode and FDD mode. Such examples are not intended to be limiting, and therefore should not be interpreted to be so. In an LTE system, base station 106 may be referred as an evolved Node B (eNB).

EPC 108 may refer to a wireless core networking module of an LTE system. Further, EPC 108 may be communicatively connected to base station 106 and further be configured to communicatively bridge base station 106 and external network 110. Further, EPC 108 may select a timeslot proportion configuration for cell 102 if cell 102 adopts TDD mode. In accordance with at least some example embodiments, in an LTE system, EPC 108 may be configured to use Internet Protocol (IP) as the protocol to transport all communication services including voice, mail, and texts, between base station 106 and external network 110. EPC 108 in an LTE system may be configured to implement packet-switching (PS) to group all transmitted data, regardless of content, type, or structure, a digital communication network. In at least one example embodiment, when an LTE system adopts TDD mode in response to a need for asymmetry between the uplink and downlink data rates, e.g., the bandwidth allocated to uplink traffic may be different from the bandwidth for downlink traffic, EPC 108 may be configured to select a timeslot proportion configuration for the communication between UE 104 and base station 106 within cell 102. Further to the example embodiment, in selecting the timeslot proportion configuration, EPC 108 may be configured to eliminate or minimize interference caused by adjacent cells using a different timeslot proportion configuration for user equipment therein.

The aforementioned timeslots may refer to subsections of a time domain over which wireless signals may be communicated. The timeslot proportion configurations may allocate certain timeslots over a time domain to uplink or downlink traffic. In accordance with at least one example embodiment, in an LTE system adopting TDD mode, cells may transmit and receive signals over a time domain that may be divided into cycles. The cycles may be further divided into a plurality of timeslots (e.g., ten timeslots in each cycle according to LTE standard), each of which may be allocated to uplink traffic or downlink traffic according to seven timeslot proportion configurations (i.e., #0-#6) standardized by 3GPP. Considering the #1 timeslot proportion configuration as an example, half timeslots of the cycle may be allocated for downlink traffic; the other half timeslots may be allocated for downlink traffic. The #1 timeslot proportion configuration, therefore, has an equal proportion for uplink traffic and downlink traffic and the ratio of uplink and downlink traffic is 1. Similarly, each of the other six timeslot proportion configurations may have a proportion for uplink and downlink traffic and a ratio respectively.

External network 110 may refer to an IP Multimedia Subsystem (IMS) framework that is configured to deliver multimedia services (e.g., internet service) to EPC 108 and further to UE 104. In accordance with at least one example embodiment, by which EPC 108 uses PS as a method in implementing a digital communication network, external network 110 may be seamlessly bridged to EPC 108.

Thus, FIG. 1 shows an example wireless communication system 100 in which one or more embodiments of configuring TDD mode may be implemented.

Figure 2:
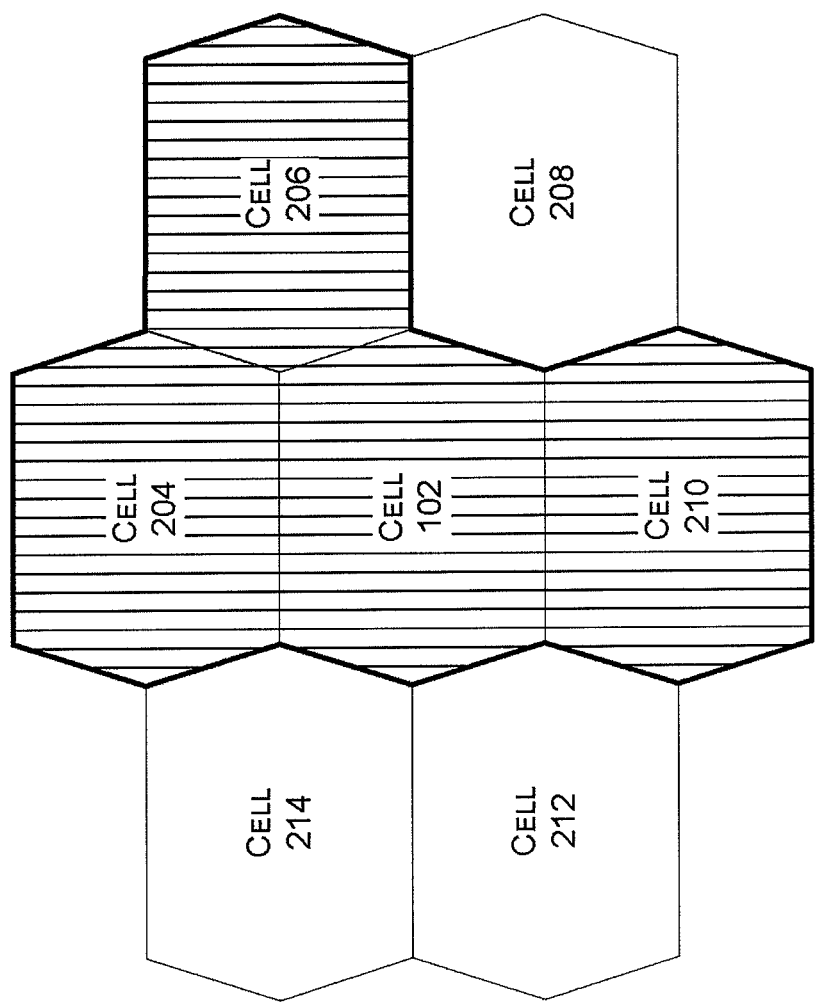
FIG. 2 shows an example cellular network in which one or more embodiments of configuring TDD mode may be implemented, arranged in accordance with at least some embodiments described herein.

FIG. 2 shows an example cellular network 200 in which one or more embodiments of configuring TDD mode may be implemented, arranged in accordance with at least some embodiments described herein. As depicted, example cellular network 200 includes, at least, cells 204, 206, 208, 210, 212, and 214, each of which is adjacent to cell 102, which remains as depicted in FIG. 1. Although cellular network 200 illustrates six cells that surround, and are adjacent to, cell 102, the example embodiments of configuring TDD mode are not so limited. The number of cells that surround, and are adjacent to, cell 102 may vary from one embodiment to another.

Cells 204-214, surrounding and adjacent to cell 102, may have internal structures similar to cell 102. That is, one or more of cells 204-214 may be equipped with an embodiment of base station 106 and one or more embodiments of user equipment 104 located within. Each embodiment of base station 106 within a respective one of cells 204-214 may be communicatively connected to EPC 108 and may further receive multimedia services from external network 110.

In accordance with at least one example embodiment, one or more of cells 204-214 may establish a database to store buffer state information regarding uplink and downlink traffic for the respective one of cells 204-214. The buffer state information regarding the uplink traffic may indicate an amount of data that remains for a user equipment (e.g., UE 104) to transmit, at a given time, from within the respective one of cells 204-214. Similarly, the buffer state information regarding the downlink traffic may indicate an amount of data remains for a base station (e.g., base station 106) to transmit, at a given time, from within the respective one of cells 204-214. The buffer state information database may be stored at each embodiment of base station 106 of the respective cells; and each embodiment of base station 106 of the respective cells may be configured to submit a buffer state report (BSR) including the buffer state information to EPC 108 periodically at a repetition rate that may be predetermined by engineers with authority for establishing a recognizable pattern of each cell. Such recognizable patterns may refer to ratios of data remaining for uplink traffic to data remaining for downlink traffic.

Further to the example embodiment, the recognizable pattern based on the buffer state information may be established with respect to each of cells 204-214, and the pattern may further be monitored by EPC 108. Accordingly, EPC 108 may be configured to group cells that demonstrate a similar pattern. That is, the cells having similar uplink and downlink traffic characteristics may be grouped together by EPC 108 for further selecting a same timeslot proportion configuration. For example, as depicted in FIG. 2, the buffer state information stored in the respective databases of cell 204, cell 206, and cell 210, as reported to EPC 108, may show similarities with the uplink and downlink traffic of cell 102. Further to the example, the similarities may refer to similar ratios of data remaining for uplink traffic to data remaining for downlink traffic. That is, similarities may exist between a cell demonstrating 1 Gigabyte (GB) data for uplink traffic and 1 GB data for downlink traffic and another cell having 2 GB data for uplink traffic and 2 GB for downlink traffic. Thus, EPC 108 may group cell 102, cell 204, cell 206, and cell 210 together as a cell cluster as shaded in FIG. 2 as a basis for further selecting a timeslot proportion configuration for the cell cluster. The buffer state information stored in the respective databases of cell 208, cell 212, and cell 214 may not show any, or enough, similarities with the uplink and downlink traffic of cell 102 or each other for EPC 108 to facilitate a grouping thereof. One or more timeslot proportion configurations different from the one selected for the cell cluster may be selected by EPC 108 for cell 208, cell 212, and cell 214 respectively.

Thus, FIG. 2 shows an example cellular network 200 in which one or more embodiments of configuring TDD mode may be implemented.

Figure 3:
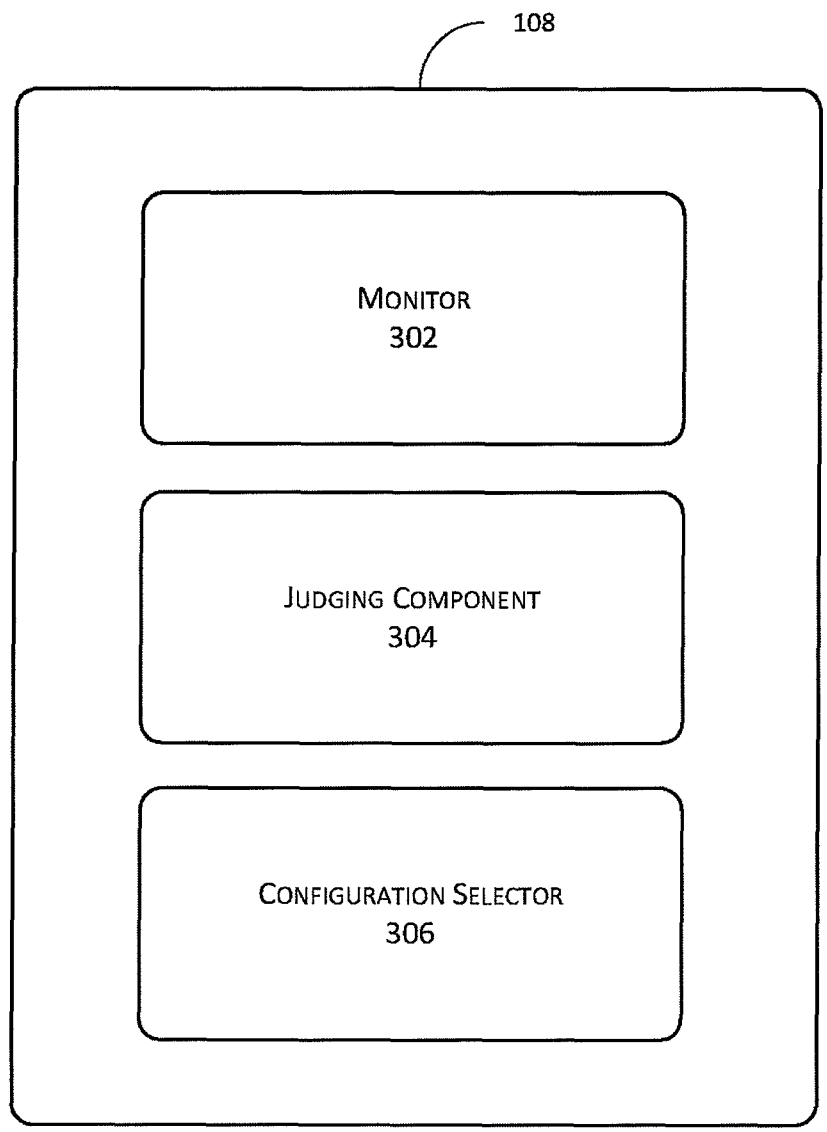
FIG. 3 shows an example Evolved Packet Core (EPC) by which one or more embodiments of configuring TDD mode may be implemented, arranged in accordance with at least some embodiments described herein.

FIG. 3 shows an example EPC 108 by which one or more embodiments of configuring TDD mode may be implemented, arranged in accordance with at least some embodiments described herein. As depicted, EPC 108 includes, at least, a monitor 302, a judging component 304, and a configuration selector 306.

Monitor 302 may refer to a component or module, implemented as software, hardware, firmware, or any combination thereof, that may be configured to monitor respective patterns of uplink traffic and downlink traffic of cell 102 as well as cells adjacent to cell 102 including cell 204-214. Monitor 302 may be configured to receive respective BSRs containing buffer state information from one or more of cells 204-214, and to recognize the patterns of uplink traffic and downlink traffic of each respective cell.

Judging component 304 may refer to a component or module, implemented as software, hardware, firmware, or any combination thereof, that may be configured to determine whether a pattern for one or more of the cells 204-214, which are adjacent to cell 102, is similar to that of cell 102. Non-limiting examples of such pattern include ratios of uplink traffic to downlink traffic such as 1, 1.5, 2.

In accordance with at least one example embodiment, judging component 304 may be configured to preset a threshold difference and to determine that at least some of the adjacent cells have similar patterns to cell 102 if the pattern difference is not greater than the threshold. Judging component 304 may further be configured to group the cells having a similar pattern with cell 102 as a cell cluster as a basis for further selecting a timeslot proportion configuration for the cell cluster.

Further to the example embodiment, judging component 304 may be configured to retrieve buffer state information from monitor 302 to calculate a ratio of remaining data for uplink traffic and downlink traffic for cell 102. Judging component 304 may be further configured to establish a traffic database that may at least include, various ratios of uplink traffic and downlink traffic of cell 102 and one or more of adjacent cells 204-214, and one or more ratio ranges that may be predetermined by standard timeslots proportion configurations. Judging component 304 may be configured to determine that one or more of adjacent cells 204-214 have a similar pattern as cell 102 if the ratios of uplink and downlink traffic of the adjacent cells and cell 102 fall in a same ratio range.

Configuration selector 306 may refer to a component or module, implemented as software, hardware, firmware, or any combination thereof, that may be configured to select a configuration from one or more timeslot proportion configurations for uplink traffic and downlink traffic for the cell cluster and to select one or more other timeslot proportion configurations for those of cells 204-214 having a pattern different than that of cell 102 based upon one or more rules, or conditions, predetermined by engineers with authority. The aforementioned timeslot proportion configurations may refer to configurations that allocate certain timeslots over a time domain to uplink or downlink traffic.

In selecting configurations for the cell cluster or for those of cells 204-214 having different patterns, configuration selector 306 may select a configuration that approximately matches the pattern (i.e., the ratio of uplink and downlink traffic) of each cell or the cell cluster according to one or more preset rules, or conditions.

In at least one example embodiment, configuration selector 306 may be configured to maintain a mode-matching database that includes, at least, patterns indicated by various ratios of uplink and downlink traffic of the cell cluster and other adjacent cells, available timeslot proportion configurations to be applied to the cell cluster and other adjacent cells, and one or more corresponding rules, or conditions, under which a given timeslot proportion configuration is applied to a corresponding ratio. When each of the timeslot proportion configurations may have a ratio for uplink and downlink traffic, configuration selector 306 may establish the corresponding rules, or conditions, according to the ratios of the timeslot proportion configurations.

For example, according to the seven timeslot proportion configurations standardized by 3GPP, each of the #0, #1, and #2 timeslot proportion configurations may have a ratio of 0.33, 1, and 3 respectively. Configuration selector 306 may establish the rules, or conditions, that the cells or the cell cluster having ratios within 0-0.67 adopt the #0 timeslot proportion configuration; the cells or the cell cluster having ratios within 0.67-1.5 adopt the #1 timeslot proportion configuration; and the cells or the cell cluster having ratios above 1.5 adopt the #2 timeslot proportion configuration. Notably, the ratio of the cell cluster may be calculated based on the total amount of remaining data of uplink and downlink traffic of all cells in the cell cluster. The example is not intended to be in any way limiting and therefore should not be interpreted to be so. Further to the example, other conditions may be established for other timeslot proportion configurations and, therefore, all ratios may have a corresponding timeslot proportion configuration. Thus, the cell cluster and the other adjacent cells may be applied with a timeslot proportion configuration corresponding to the ratio of uplink and downlink traffic.

Thus, FIG. 3 shows an example EPC 108 by which one or more embodiments of configuring TDD mode may be implemented.

Figure 4:
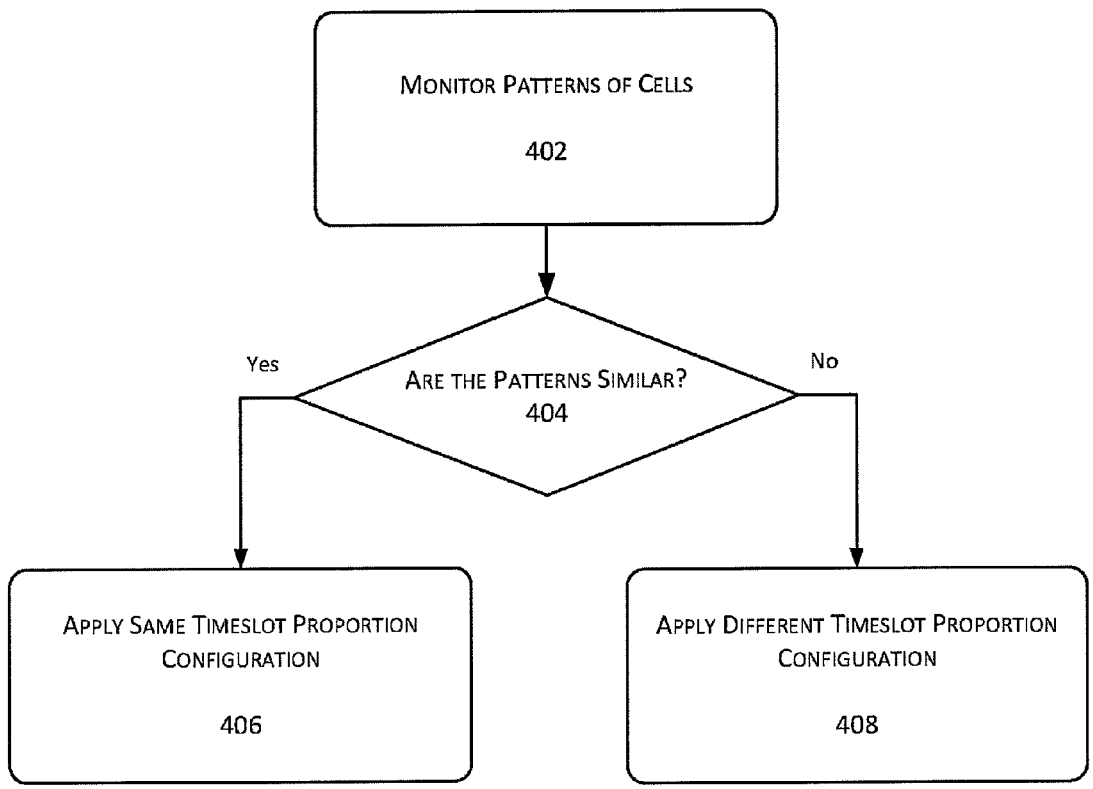
FIG. 4 shows an example configuration of a processing flow of operations for implementing one or more embodiments of configuring TDD mode, arranged in accordance with at least some embodiments described herein.

FIG. 4 shows an example configuration of a processing flow 400 of operations for which one or more embodiments of configuring TDD mode may be implemented, arranged in accordance with at least some embodiments described herein.

As depicted, processing flow 400 may include sub-processes executed by various components that are part of wireless communication system 100. However, processing flow 400 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, and/or 408. Processing may begin at block 402.

Block 402 (Monitor Patterns of Cells) may refer to monitor 302 monitoring respective patterns of uplink traffic and downlink traffic of cell 102 and one or more of adjacent cells 204-214. Monitor 302 may be configured to receive respective BSRs that include buffer state information from one or more of cells 204-214 and to recognize patterns of uplink traffic and downlink traffic for each respective cell. Processing may continue from block 402 to 404.

Decision block 404 (Are the Patterns Similar?) may refer to judging component 304 determining whether each pattern of adjacent cells including cell 204-214 is similar to the pattern of cell 102. Block 404 may further refer to judging component 304 grouping the cells having a similar pattern with cell 102 as a cell cluster. Processing may continue from block 404 to 406 if "yes," or from block 404 to 408 if "no."

Block 406 (Apply Same Timeslot Proportion Configuration) may refer to configuration selector 306 applying a same timeslot proportion configuration to the cell cluster including cell 102 and others of adjacent cells 204-214 that have patterns similar to cell 102.

Block 408 (Apply Different Timeslot Proportion Configuration) may refer to configuration selector 306 applying a different timeslot proportion configuration to each of adjacent cells 204-214 that have a different pattern than cell 102.

In at least one example embodiment, processing may start over from block 402 when the ratios of uplink and downlink traffic of the cells change.

Thus, FIG. 4 shows an example configuration of a processing flow 400 of operations for which one or more embodiments of configuring TDD mode may be implemented.

Figure 5:
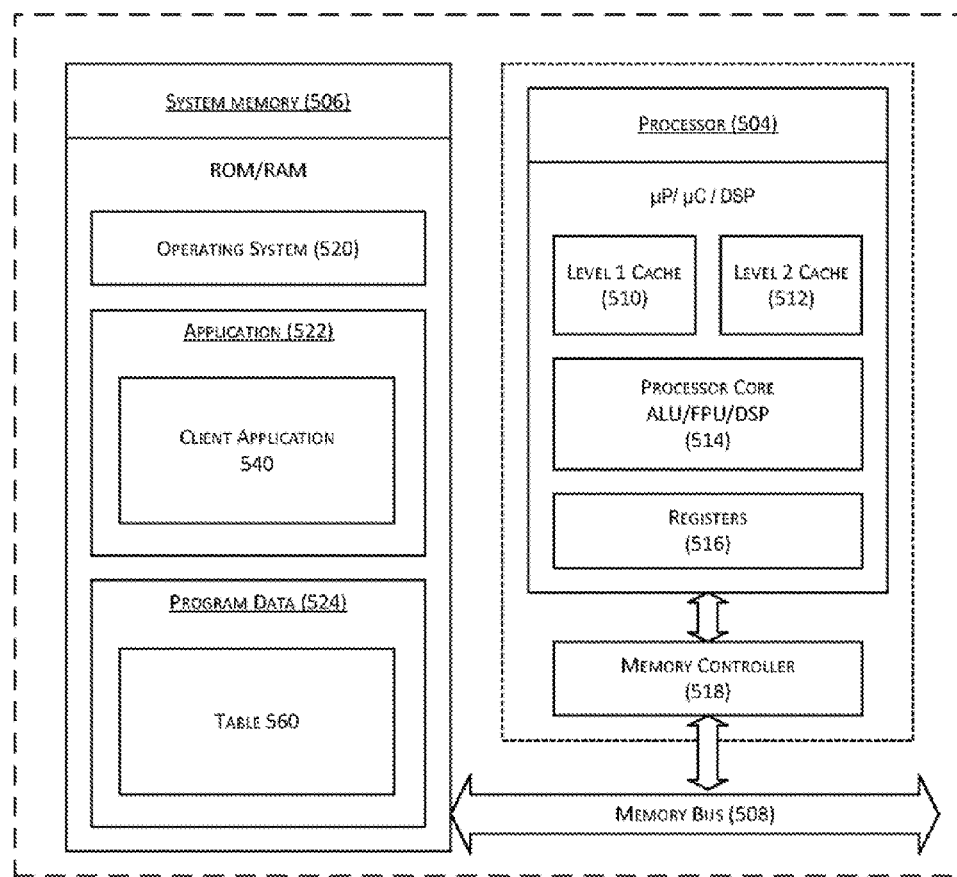
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 500 may typically include one or more processors 504 and a system memory 506. A memory bus 508 may be used for communicating between processor 504 and system memory 506.

Depending on the desired configuration, processor 604 may be of any type including but not limited to a microprocessor (µP), a microcontroller (µC), a digital signal processor (DSP), or any combination thereof. The processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, system memory 506 may be of any type including but not limited to volatile memory (such as RAM), non-volatile memory (such as ROM, flash memory, etc.) or any combination thereof. System memory 606 may include an operating system 520, one or more applications 522 including client application 540, and program data 524.

Application 522 may be configured to configure TDD mode as described previously with respect to FIGS. 1-4. Program data 524 may include a table 560, which may be useful for implementing actuation of appropriate components or modules as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
monitoring respective patterns of uplink traffic and downlink traffic in a first cell and at least a second cell that is adjacent to the first cell; and
applying one of a plurality of timeslot proportion configurations for uplink traffic and downlink traffic in a cell cluster that includes the first cell and the second cell in response to a difference between the pattern of uplink traffic and downlink traffic in the first cell and the pattern of uplink traffic and downlink traffic in the second cell being less than a threshold difference.

2. The method as recited in claim 1, wherein the monitoring the respective patterns of uplink traffic and downlink traffic in the first cell and at least the second cell comprises monitoring buffer state information related to the first cell and the second cell.

3. The method as recited in claim 1, wherein at least the second cell comprises a plurality of cells that are adjacent to the first cell, and wherein the cell cluster comprises the first cell and the plurality of cells that are adjacent to the first cell.

4. The method as recited in claim 1, wherein the one of the plurality of timeslot proportion configurations applied for uplink traffic and downlink traffic in the cell cluster comprises one of a plurality of timeslot proportion configurations in accordance with the 3GPP standards that approximately matches a pattern of uplink traffic and downlink traffic in the cell cluster.

5. The method as recited in claim 1, further comprising:
applying a first timeslot proportion configuration of the plurality of timeslot proportion configurations in the first cell and applying a second timeslot proportion configuration of the plurality of timeslot proportion configurations in the second cell for uplink traffic and downlink traffic in the first cell and the second cell, respectively, in response to the difference between the pattern of uplink traffic and downlink traffic in the first cell and the pattern of uplink and downlink traffic in the second cell being greater than the threshold difference,
wherein the first timeslot proportion configuration and the second timeslot proportion configuration are different.

6. The method as recited in claim 5, wherein the first timeslot proportion configuration and the second timeslot proportion configuration comprise two different timeslot proportion configurations in accordance with the 3GPP standards,
wherein further the first timeslot proportion configuration approximately matches the pattern of uplink traffic and downlink traffic in the first cell, and
wherein further the second timeslot proportion configuration approximately matches the pattern of uplink traffic and downlink traffic in the second cell.

7. The method as recited in claim 1, further comprising:
monitoring a pattern of uplink traffic and downlink traffic in the cell cluster by obtaining buffer state information related to the first cell and at least the second cell; and
applying a different one of the plurality of timeslot proportion configurations for uplink traffic and downlink traffic in the cell cluster in response to a change in the pattern of uplink traffic and downlink traffic in the cell cluster according to the obtained buffer state information while the difference between the pattern of uplink traffic and downlink traffic in the first cell and the pattern of uplink traffic and downlink traffic in the second cell is less than the threshold difference.

8. The method as recited in claim 1, further comprising:
establishing a first knowledge base of various ratios of uplink traffic and downlink traffic and one or more ratio ranges predetermined by corresponding timeslot proportion configurations.

9. The method as recited in claim 8, further comprising:
establishing a second knowledge base of various ratios of uplink traffic and downlink traffic, corresponding timeslot proportion configurations, and corresponding conditions under which a given timeslot proportion configuration is applied to a corresponding ratio of uplink traffic and downlink traffic.

10. An apparatus, comprising:
a memory in which a set of processor-executable instructions is stored; and
a processor coupled to the memory, upon executing the set of processor-executable instructions, performing operations comprising:
obtaining information indicative of one or more conditions and related to uplink traffic and downlink traffic in a first cell and in a second cell that is adjacent to the first cell;
adopting one of a plurality of timeslot proportion configurations for uplink traffic and downlink traffic in the first cell and in the second cell in response to the obtained information being indicative of a first condition; and
adopting each of two of the plurality of timeslot proportion configurations for uplink traffic and downlink traffic in a respective one of the first cell and the second cell in response to the obtained information being indicative of a second condition different from the first condition.

11. The apparatus as recited in claim 10, wherein the obtained information comprises buffer state information related to the first cell and the second cell.

12. The apparatus as recited in claim 10, wherein each of the adopted ones of the plurality of timeslot proportion configurations comprises a respective one of a plurality of timeslot proportion configurations in accordance with the 3GPP standards that approximately matches a respective pattern of uplink traffic and downlink traffic in at least one of the first cell and the second cell.

13. The apparatus as recited in claim 10, wherein the processor causes the one of the plurality of timeslot proportion configurations to be adopted for uplink traffic and downlink traffic in the first cell and the second cell in response to the obtained information indicative of the first condition by performing operations comprising:
determining a first pattern of uplink traffic and downlink traffic in the first cell based at least in part on the obtained information related to uplink traffic and downlink traffic in the first cell;
determining a second pattern of uplink traffic and downlink traffic in the second cell based at least in part on the obtained information related to uplink traffic and downlink traffic in the second cell; and
adopting the one of the plurality of timeslot proportion configurations for uplink traffic and downlink traffic in a cell cluster that includes the first cell and the second cell in response to a difference between the first pattern and the second pattern being less than a threshold difference.

14. The apparatus as recited in claim 10, wherein the processor causes each of the two of the plurality of timeslot proportion configurations to be adopted for uplink traffic and downlink traffic in a respective one of the first cell and the second cell in response to the obtained information being indicative of the second condition different from the first condition by performing operations comprising:
- determining a first pattern of uplink traffic and downlink traffic in the first cell based at least in part on the obtained information related to uplink traffic and downlink traffic in the first cell;
- determining a second pattern of uplink traffic and downlink traffic in the second cell based at least in part on the obtained information related to uplink traffic and downlink traffic in the second cell;
- adopting a first timeslot proportion configuration of the plurality of timeslot proportion configurations for uplink traffic and downlink traffic in the first cell in response to a difference between the first pattern and the second pattern being greater than a threshold difference; and
- adopting a second timeslot proportion configuration of the plurality of timeslot proportion configurations for uplink traffic and downlink traffic in the second cell further in response to the difference between the first pattern and the second pattern being greater than the threshold difference,
- wherein the second timeslot proportion configuration is different from the first timeslot proportion configuration.

15. The apparatus as recited in claim 10, wherein the processor is further configured to perform operations comprising:
- monitoring a pattern of uplink traffic and downlink traffic in a cell cluster that includes the first cell and the second cell by obtaining buffer state information related to the first cell and the second cell; and
- applying a different one of the plurality of timeslot proportion configurations for uplink traffic and downlink traffic in the cell cluster in response to a change in the pattern of uplink traffic and downlink traffic in the cell cluster according to the obtained buffer state information while the difference between the pattern of uplink traffic and downlink traffic in the first cell and the pattern of uplink traffic and downlink traffic in the second cell is less than the threshold difference.

16. The apparatus as recited in claim 15, wherein the processor is further configured to perform operations comprising:
- establishing a first knowledge base of various ratios of uplink traffic and downlink traffic and corresponding timeslot proportion configurations to be applied to a given cell cluster that comprises a plurality of adjacent cells.

17. The apparatus as recited in claim 16, wherein the processor is further configured to perform operations comprising:
- establishing a second knowledge base of various ratios of uplink traffic and downlink traffic, corresponding timeslot proportion configurations, and corresponding conditions under which a given timeslot proportion configuration is applied to a corresponding ratio of uplink traffic and downlink traffic.

18. A non-transitory computer-readable medium storing instructions that, when executed, cause one or more processors to perform operations comprising:
- establishing a first knowledge base of various ratios of uplink traffic and downlink traffic and corresponding timeslot proportion configurations of a plurality of timeslot proportion configurations to be applied to a given cell cluster that comprises a plurality of adjacent cells;
- establishing a second knowledge base of various ratios of uplink traffic and downlink traffic, corresponding timeslot proportion configurations of the plurality of timeslot proportion configurations, and corresponding conditions under which a given timeslot proportion configuration is applied to a corresponding ratio of uplink and downlink traffics;
- monitoring respective patterns of uplink traffic and downlink traffic in a first cell and at least a second cell that is adjacent to the first cell; and
- applying a timeslot proportion configuration of the plurality of timeslot proportion configurations to the first cell or a cell cluster that comprises the first cell and at least the second cell for uplink traffic and downlink traffic in the first cell or the cell cluster in response to a pattern of uplink traffic and downlink traffic in the first cell or the cell cluster approximately matching the applied timeslot proportion configuration,
- wherein the applied timeslot proportion configuration is selected from the first knowledge base or the second knowledge base.

19. The non-transitory computer-readable medium as recited in claim 18, wherein the monitoring the respective patterns of uplink traffic and downlink traffic in the first cell and at least the second cell comprises monitoring buffer state information related to the first cell and the second cell.

20. The non-transitory computer-readable medium as recited in claim 18, wherein the at least a second cell comprises a plurality of cells that are adjacent to the first cell, and wherein the cell cluster comprises the first cell and the plurality of cells that are adjacent to the first cell.

* * * * *